Sept. 14, 1926.  1,599,756
V. A. FYNN
SYNCHRONOUS MOTOR
Filed Feb. 4, 1924   4 Sheets-Sheet 1

Inventor:
VALÈRE, ALFRED, FYNN.
By John T. Brunynga
Attorney.

Sept. 14, 1926.

V. A. FYNN 1,599,756

SYNCHRONOUS MOTOR

Filed Feb. 4, 1924    4 Sheets-Sheet 2

Inventor.
VALÈRE, ALFRED, FYNN.
By John F. Bruninga
Attorney.

Sept. 14, 1926.

V. A. FYNN 1,599,756

SYNCHRONOUS MOTOR

Filed Feb. 4, 1924   4 Sheets-Sheet 3

Inventor.
VALÈRE, ALFRED, FYNN.
Attorney.

Sept. 14, 1926.

V. A. FYNN 1,599,756

SYNCHRONOUS MOTOR

Filed Feb. 4, 1924  4 Sheets-Sheet 4

Patented Sept. 14, 1926.

1,599,756

UNITED STATES PATENT OFFICE.

VALÈRE ALFRED FYNN, OF ST. LOUIS, MISSOURI.

SYNCHRONOUS MOTOR.

Application filed February 4, 1924. Serial No. 690,441.

My invention relates to the starting of dynamo-electric machines in which a revolving field of more or less uniform magnitude is produced at least during the starting period, and which derive their excitation from an exciter delivering uni-directional voltage at synchronism and slip frequency voltage at other speeds. It also relates to the operation of machines provided with the type of exciter described and more particularly, it relates to polyphase synchronous induction motors.

The objects and features of this invention will appear from the detail description taken in connection with the accompanying drawings and will be pointed out in the claims.

In the accompanying diagrammatic drawings, Figs. 1, 2, 3 and 4 show two-pole embodiments of my invention as applied to a separately excited three-phase synchronous induction motor, and Figs. 5 to 14 inclusive are explanatory diagrams.

Figure 1:
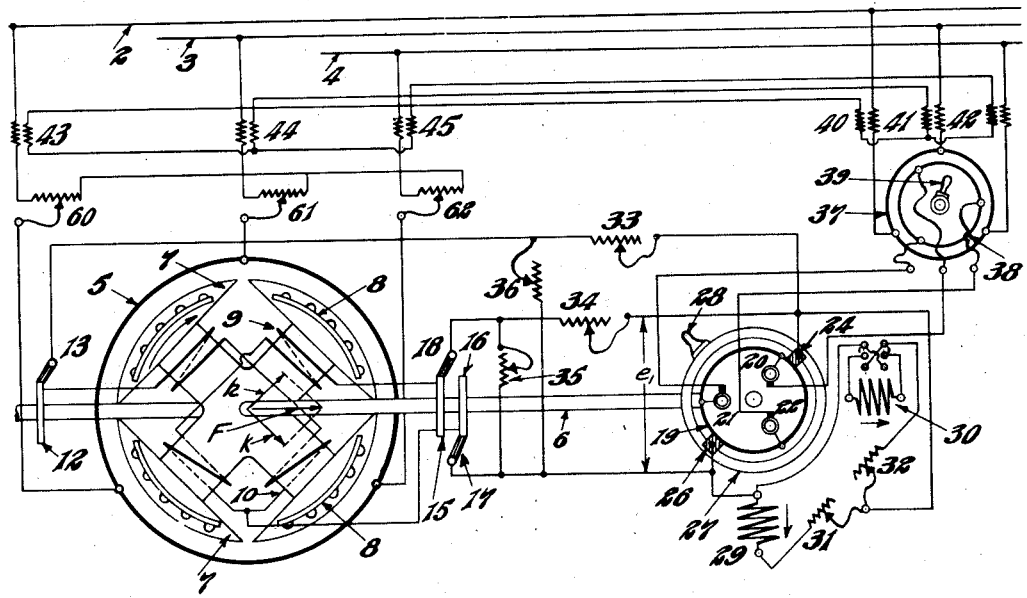

Referring to Fig. 1, the separately excited three-phase two-pole synchronous induction motor represented therein comprises a primary three-phase winding 5 of any desired type located on the stationary member or stator of the machine and connected to the three-phase supply 2, 3, 4 through the adjustable ratio transformers 60, 61, 62. For the purpose of more clearly illustrating this motor, the rotor is shown as having distinct polar projections 7. The two-pole rotor is provided with a two-phase winding, the elements 9 and 10 of which are displaced by 90 electrical degrees and in consequence there are shown four polar projections on the rotor, diametrically opposed projections carrying parts of the same element of the polyphase rotor winding. The element or phase 9 is connected to the slip-rings 15, 16, with which co-operate stationary brushes 17, 18. The phase 10 is connected to the slip-rings 16, 12, with which cooperate the stationary brushes 17, 13. The slip-rings are carried by the shaft 6. The rotor further carries another, preferably polyaxially closed, winding shown in Fig. 1 in the form of a squirrel cage 8. Mounted on the shaft 6 of the synchronous induction motor is an exciter, the revolving member of which carries a winding 19 adapted to be connected to the supply 2, 3, 4 by means of the slip-rings 20, 21, 22 and stationary brushes co-operating with same, and also connected to a commutator with which co-operate the brushes 24, 26 insulatingly held in the movable brush support 27, the position of which can be conveniently altered by means of the handle 28. In the figure the commutator connected to the winding 19 is not shown, and it is assumed that the brushes rest directly on the winding 19, thus eliminating all uncertainty as to their position relatively to said winding. The stationary member co-operating with the rotor of the exciter is laminated and carries two exciting windings 29 and 30, connected in parallel and to the brushes 24, 26 with an adjustable resistance 31, 32 in the circuit of each. These windings are located on each side of the perpendicular to the brush axis, each being displaced 45 electrical degrees from said axis. They are connected to produce a resultant magnetization which can be shifted through 90 degrees by manipulating the resistances 31, 32 and through an additional 90 by reversing one of them. The brushes 24 and 26 are connected to the slip-rings 15, 16 with the interposition of the adjustable resistance 34. Brush 24 is also connected to slip-ring 12 with the interposition of the adjustable resistance 33. The slip-rings 15, 16 are shunted by means of the adjustable resistance 35 and the slip-rings 16, 12 by means of the adjustable resistance 36. The winding 19 on the revolving member of the exciter is connected to the mains 2, 3, 4 with the interposition of a phase regulator, the primary 37 of which is stationary and connected to the supply 2, 3, 4 while its secondary 38 can be rotated within the primary by means of the handle 39, thus causing the phase of the polyphase E. M. F.'s impressed on the slip-rings 20, 21, 22 to assume any desired relation with respect to the phase of the line E. M. F.'s. The primaries of the series transformers 43, 44, 45 are included in the connections between the primary winding 5 of the synchronous induction motor and the supply 2, 3, 4. Similarly, the secondaries of the series transformers 40, 41, 42 are included in the connections between the primary 37 of the phase regulator and the supply 2, 3, 4. The secondaries of the series transformers 43, 44, 45 are connected to the primaries of the series transformers 40, 41, 42. The rotor windings 9 and 10 can be connected in parallel with respect to the brushes 24, 26 by means of the adjustable resistance 33.

Figure 2:
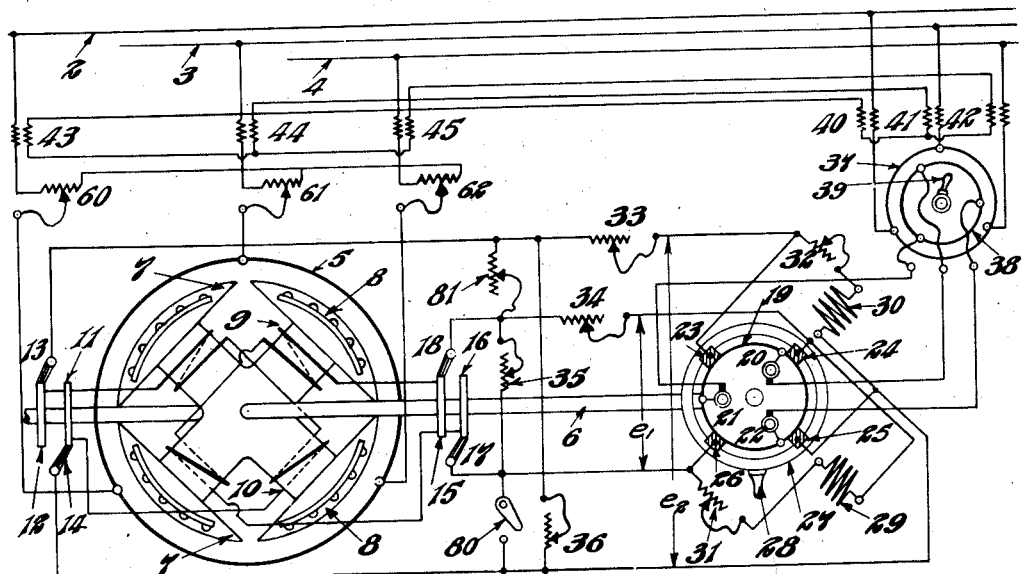

Fig. 2 differs from Fig. 1 in that each of the slip-ring windings on the secondary of the motor is connected to independent slip-rings, 9 being connected to 15, 16 and 10 to 11, 12. Furthermore, the exciter is provided with a polyphase arrangement of brushes to correspond with the polyphase slip-ring windings on the motor and makes polyphase slip frequency voltages available at the brushes 24, 26 and 23, 25. The windings 9, 10 being in quadrature, the additional set of brushes 23, 25 are displaced from the brush set 24, 26 by 90 electrical degrees. The exciter brushes 24, 26 are connected to the slip-rings 15, 16 through the adjustable resistance 34 and the exciter brushes 23, 25 to the slip-rings 11, 12 through the adjustable resistance 33. The two slip-ring windings can be connected in parallel with respect to either set of exciter brushes by means of the switch 80 and the adjustable resistance 81. The stator of the exciter carries two exciting windings 29 and 30, the first being connected to the brushes 24, 26 with the inter-position of the adjustable resistance 31 and the second to the brushes 23, 25 through the adjustable resistance 32.

Figure 3:
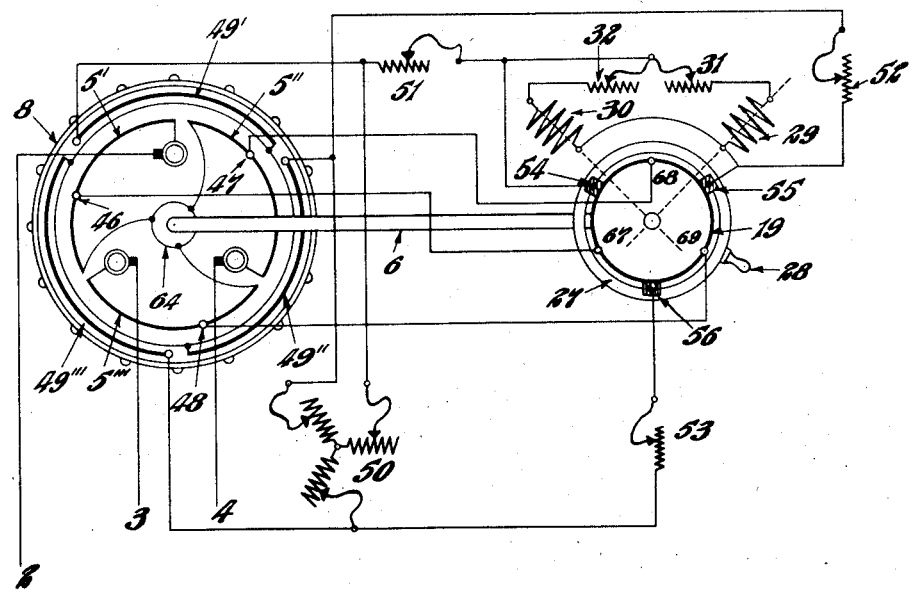

In Fig. 3 the three-phase star connected primary winding 5′, 5″, 5‴ is located on the rotor and connected to the supply 2, 3, 4 through slip-rings and brushes co-operating with same. The stator carries a three-phase star connected winding 49′, 49″, 49‴ and a squirrel cage 8. Mounted on the shaft 6 of the motor is the armature of the converter exciter with a three-phase winding 19 connected to a commutator and to three points 46, 47, 48 of the primary 5 of the motor. The said points are so chosen with reference to the zero point of the star winding 5 as to produce exciter brush voltages of the desired magnitude and the three points 67, 68, 69 of the winding 19 are so selected as to give said voltages the desired phase for a selected position of the brushes 54, 55, 56. The stator of this exciter carries two exciting windings 29 and 30, displaced by 90 electrical degrees, and a movable brush support 27 provided with a handle 28. The brush support insulatingly carries the brushes 54, 55, 56 displaced by 120 electrical degrees and co-operating with the commutator connected to 19. The windings 29 and 30 are connected in parallel and to the brushes 54, 55 with an adjustable resistance 31, 32 in the circuit of each. These windings are located on each side of the perpendicular to the brush axis, each being displaced 45 electrical degrees from said axis. They are connected to produce a resultant magnetization which can be shifted through 90 degrees by manipulating the resistances 31, 32 and through an additional 90 by reversing one of them. The secondary stator winding 49′, 49″, 49‴, can be shunted or short-circuited by the adjustable three leg resistance 50 and one of the adjustable resistances 51, 52, 53 is included between an exciter brush and a terminal of the secondary motor winding 49.

Figure 4:
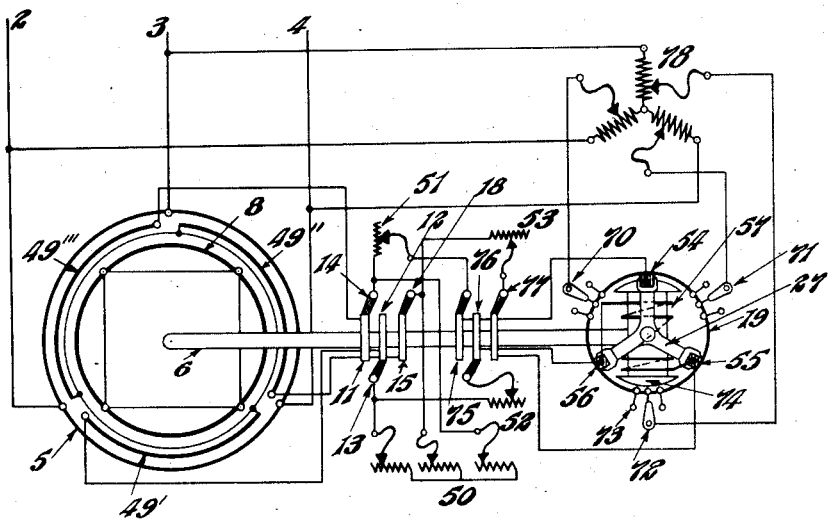

Fig. 4 also shows a two-pole three-phase induction motor. The stator is the primary and carries a three-phase winding 5 connected to the supply 2, 3, 4, the rotor is the secondary and carries a permanently short-circuited four-phase winding 8 and a star connected three-phase winding 49 joined to the slip-rings 11, 12, 15 mounted on the shaft 6 and with which co-operate the stationary brushes 14, 13, 18. Mounted on the same shaft 6 is the member 74 of the exciter provided with the exciting winding 57 and insulatingly carrying the brushes 54, 55, 56 by means of the brush support 27 which revolves with 74. The stationary member of the exciter carries a three-phase winding 19 provided with a commutator with which co-operate the brushes 54, 55, 56 and connected to the supply 2, 3, 4 through the adjustable three-phase transformer 78. The points of connection of the supply to 19 can be varied by means of the switches 70, 71, 72 and the taps 73 on the winding 19. The brushes are connected to the slip-rings 75, 76, 77 mounted on the shaft 6. The regulating devices for the circuits comprising the winding 49 are included between the slip-rings to which the exciter brushes are connected and those to which the three terminals of 49 are joined. When regulation of said circuits is not desired all the slip-rings can be omitted. The adjustable resistance 51 is included between the slip-rings 75 and 11, the adjustable resistances 52 and 53 between the slip-rings 76, 12 and 77, 15. The three leg resistance 50 is connected to the slip-rings 11, 12, 15 to shunt and short-circuit the three-phase winding 49.

The motors shown in Figs. 1, 2, 3 and 4 can be started, synchronized and operated in different ways according to the results it is desired to secure. Referring more particularly to Fig. 1, let it first be assumed that the secondary winding 10 on the rotor of the motor, the slip-ring 12 and the resistance 33 are omitted. The motor can be started in some well known way as an induction motor, particularly if the rotor is built without polar projections and carries a polyphase winding located and distributed as is usual in induction motors. The squirrel cage 8 can do duty as a secondary, and the transformers 60, 61, 62 can be used to lower the terminal voltage at starting. During the early stages the circuit of the rotor winding 9 can either be open or closed over a suitably high resistance 34 and the brushes 24, 26 of the exciter, thereby protecting the commutator of the exciter from the heavy starting currents. Under these conditions the motor will run up to a nearly synchronous speed.

If the usual unidirectional exciting current were now fed into the winding 9, as has been done, the motor would develop an alternating synchronizing torque of slip frequency and could not synchronize with anything like full load torque with anywhere near normal exciting current and particularly not if it had been designed for good induction motor starting characteristic and high weight efficiency, which is, of course, very desirable. If alternating current of slip frequency but of a phase differing materially from that here defined is fed into the winding 9 and an attempt is made to regulate the phase of the current in 9 due to this alternating voltage in order to improve the synchronizing torque, the result will also be unsatisfactory because the slip frequency is so small as to preclude the possibility of materially influencing the phase of this current. The resultant synchronizing torque will be of double the slip frequency. According to this invention I connect the winding 9 to an exciter 19 which, at speeds differing from the synchronous, supplies alternating voltage of slip frequency and of such phase that the resulting synchronizing torque is unidirectional, or substantially so, and preferably only pulsates and does not reverse. Just how the phase of this voltage of slip frequency is to be selected and how this synchronizing torque is produced will be stated hereafter. This voltage can be applied at any time during the starting period; in the larger motors it will preferably be applied in the latter part of said period. The phase of this voltage which is derived from the brushes 24, 26 can be adjusted in Fig. 1 either by adjusting the phase of the voltages impressed on the slip-rings 20, 21, 22 of the exciter by means of the phase regulator 37, 38, or by displacing the exciter brushes on the commutator by means of the brush carrier 27 and its handle 28. When a phase regulator is provided it is obviously simplest to use it for making said adjustment. It is not necessary to use a phase regulator and adjustable brushes, one of these adjusting means can be dispensed with. Nor is it necessary when using a phase regulator to have the secondary 38 thereof movable. It is obviously equivalent to move the points at which the leads from the slip-rings 20, 21, 22 are connected to the secondary 38. Except for experimental purposes or in cases where the starting load characteristic of the motor is to be widely varied in use, the latter method is clearly preferable since it is not usually necessary to alter the adjustment after it has once been correctly made. In all cases the phase regulator can do duty as a reducing transformer as well as a phase adjuster.

The exciter 19, being supplied with line frequency currents over its slip-rings 20, 21, 22, a revolving flux is produced by 19 and the connections are such that said flux is caused to revolve oppositely to the direction of rotation of 19 which is determined by that of the rotor 7 of the motor. The frequency of the brush voltage will then always be proportional to the slip of the motor becoming zero at synchronism, at which speed the exciter supplies a unidirectional voltage. Assuming now that the phase of the brush voltage, so long as it is alternating, has been chosen in accordance with this invention, the motor will develop a powerful and most effective synchronizing torque even when the resistance 34 is so set during the synchronizing period as to produce, without change in setting, the desired unidirectional excitation of the motor at synchronous speed. The machine will pull into step with considerable overload and continue to operate as a synchronous motor.

This substantially unidirectional torque will effectively and smoothly bridge the gap between the decreasing induction motor torque which becomes zero at synchronism and the synchronous motor torque, after which the machine will operate as a synchronous motor. If loaded beyond its torque capacity as a synchronous motor, the machine will slip back into asynchronous operation, the gap between the synchronous and asynchronous torque again being bridged by the synchronizing torque.

While operating as a synchronous motor it will exhibit the self-regulating or compounding characteristic inherent to all synchronous motors excited from a converter, whether the latter is integral with the motor as in some self-excited synchronous motors, for instance in that disclosed in U. S. P. 1,337,648, or is independent from the motor as in Fig. 1, in U. S. P. 1,331,055 and in other known separately excited synchronous motors. This self-regulation affects the excitation of the motor and is brought about by the fact that the periodical space relation of the two members of a synchronous motor changes with load. In this case the rotor 7 will momentarily check or accelerate its angular velocity in response to a change in load, or excitation, and thus change its periodical space relation with reference to the stator 5. But this momentary change in velocity similarly affects the periodical space relation between the points on winding 19 to which the slip-rings 20, 21, 22 are connected, and which move with 7, and the brushes 24, 26. This change brings about a change in the magnitude of the exciting voltage which accounts for the inherent and automatic self-regulating feature of this class of machine. How to properly take advantage of this feature in operating this machine will be explained later. For the time being it will simply be stated that the manner or rate of the change of the magnitude of the exciting voltage brought about by the inherent regulation of the machine can be varied within wide limits. In this case, it can be varied by changing the phase of the voltages impressed on the slip-rings of the exciter or by displacing the exciter brushes.

The inherent regulation just referred to may not be sufficient for all purposes or it may be desirable to secure a somewhat different variation of th exciting voltage. This can be done, for instance, by means of the series transformers 43, 44, 45 and 40, 41, 42. These may be so connected that as the currents taken by the motor increase, the voltages impressed on the slip-rings 20, 21, 22 of the exciter are either lowered or raised, their phase being also affected according to the relation of the phases of the motor currents to the phases of the supply voltages. These series transformers need not always be used.

The exciting windings 29, 30 located on the stationary member of the exciter can be omitted. Their main purpose is to control the power factor of the exciter at its slip-rings or of the exciter slip-ring circuits at the points of their connection to the supply 2, 3, 4. Because the moving member of this converter-exciter is mechanically coupled to the revolving member of the motor it is not free to adjust itself to changes of exciter load or excitation and a more uniform power factor can often be obtained by locating the axis of the resultant unidirectional exciter excitation at an angle to the axis of the brushes connected to the winding or windings producing said excitation. If the position of the brushes is changed for one reason or another the desired relation between the axis of the resultant magnetization due to 29 and 30 and the brush axis can be at once re-established by manipulating the resistances 31, 32 or reversing one of the windings 29 or 30 as heretofore explained.

When the winding 10 and the slip-ring 12 of Fig. 1 are available, the machine may be started exactly as just described except that the slip-ring windings 9 and 10 are connected in parallel and to the brushes 24, 26 through the resistances 34 and 33. It will be seen that the so connected windings will produce a resultant magnetization F dependent on the magnitude and direction of the component magnetization $h$ and $k$ produced by 9 and 10 respectively. When the components are of equal magnitude and displaced by 90 degrees, the resultant will be displaced by 45 degrees from each component as shown by the small diagram in Fig. 1. The phase of the alternating brush voltage is in this case chosen with reference to the axis of this resultant rotor magnetization, otherwise the procedure is exactly as previously described.

When two phase displaced slip-ring windings such as 9 and 10 are available the compounding characteristic of the machine can be very readily changed by changing the relation of the unidirectional ampere turns in 9 and in 10.

The motor of Fig. 1 can also be started with or without the use of the squirrel cage 8 by interrupting the connection between the commutator and the windings 9 and 10 or giving the resistances 33 and 34 a sufficiently high value to protect the commutator and then close said windings over the resistances 35 and 36, starting the machine just like a slip-ring induction motor. When up to speed 35 and 36 are disconnected in one or more steps and 33 and 34 reduced in one or more steps to their operating values. The machine will synchronize as before and its compounding characteristic may be modified by one of the means available for this purpose. If a squirrel cage 8 or its equivalent is used, it is preferably given a high resistance and allowed to take care of the initial starting torque.

Turning now to Fig. 2. The machine may be started as an induction motor with the help of a winding such as 8, which is or can be closed along a plurality of axes per pole pair or it can be started like a slip-ring motor by reducing the resistances 35 and 36 to zero in one or more steps. These two methods can, of course, be combined. After the machine has reached what is considered to be a sufficiently high speed and if the resistances 35, 36 are being used, they are disconnected in one or more steps and the resistances 33, 34 reduced in one or more steps to their synchronizing value. Assuming that the phase of the polyphase alternating brush voltages has been chosen in accordance with this invention, a practically uniform synchronizing torque will be developed which will readily bring the motor into step even with the heaviest overload the machine can handle. When synchronous speed has been reached, all but one of the brush circuits are disconnected or their resistance greatly increased. In Fig. 2 I prefer to disconnect, say, the brushes 23, 25 at 33 and connect 10 in parallel to 9 and the brushes 24, 26 by closing switches 80 and 81 and adjusting the resistance of the circuits comprising 9 and 10 to secure the desired operating characteristic.

When a polyphase arrangement of exciter brushes and a corresponding polyphase arrangement of secondary motor windings are available and the motor is not large or the starting torque to be developed in a large motor is not great, then such resistances as 35, 36 may be dispensed with and the machine started and synchronized by closing the motor secondaries over the exciter brushes and reducing the resistances 33, 34 or their equivalent until synchronism is reached. The starting torque in such case is not very great because of the reactance of the exciter winding 19 and the procedure heavily taxes the commutator of the exciter.

At synchronous speed, with both exciter brush circuits connected to the secondary of the motor, one of the exciter brush voltages is likely to be higher than the other, in fact, one may be substantially at its maximum while the other is substantially zero. The least disturbance is created when the latter circuit is disconnected and generally speaking, when the lower exciter voltage circuit is disconnected independently of whether the speed is synchronous or not. It is not necessary to make use of two exciting windings 29 and 30 on the exciter. If one only is used, then it is best to disconnect after synchronizing those exciter brushes which are not connected to an exciter exciting winding.

Turning now to Fig. 3, this can be operated in substantially the same way as Figs. 1 or 2, notwithstanding the fact that the motor primary is on the rotor and its secondary on the stator. The winding 49 is connected to the brushes 54, 55, 56 of the exciter without the interposition of slip-rings because the winding and the brushes are stationary. Because 49 is a three-phase winding, the polyphase arrangement of brushes on the commutator of the exciter is also three-phase. The motor can be operated with or without the permanently short-circuited winding 8. If 8 is not used or has a high resistance, then the three leg resistance 50 is preferably used at starting just like in an ordinary induction motor. Assuming that the phase adjustment for synchronizing the motor is so made that a substantially uniform pulsating synchronizing torque is developed by 49′ when connected to the brushes 54, 55; by 49″ when connected to the brushes 55, 56 and by 49‴ when connected to the brushes 56, 54, then such a torque can be produced with the resistance 50 in use, for instance by disconnecting 49′ from 50 in one or more steps and connecting brush 54 to 49′ through 51 and brush 55 to 49″ through 52 and adjusting the values of 51 and 52 in one or more steps to their synchronizing or operating values. A pulsating synchronizing torque can be similarly produced with any other pair of exciter brushes. If a pulsating synchronizing torque is sufficient for the use in view, then the exciter brush 56 and the resistance 53 can be omitted. After synchronizing, the connections just described need not be disturbed but the resistance in the exciter brush circuit can be adjusted to any desired value. To secure a substantially constant synchronizing torque the phases 49′, 49″, 49‴ are disconnected from the resistance 50 in one or more steps and the brushes 54, 55, 56 preferably simultaneously connected to the corresponding phases by reducing the adjustable resistances 51, 52, 53 in one or more steps to their synchronizing values. Thereafter, and if desired, two of the phases may be shortcircuited in series by means of 50 and the combination thus formed left connected to the brushes which produce a pulsating synchronizing torque with the third phase. Thus, 49″ and 49‴ can be short-circuited over 50 and the brush 56 disconnected at 53. If the machine is synchronized with a polyphase torque and the connections between exciter and secondary of the motor are thereafter changed, it is here, as in all other cases, preferable to let those brushes provide the unidirectional excitation at synchronous speed which are connected to the exciting winding or windings on the secondary of the exciter. The desired relation between the axis of the resultant magnetization produced by the secondary of the exciter and any exciter brush axis is brought about by suitably manipulating the resistances 31 and 32.

Here the phase and the magnitude of the voltages impressed on 19 are not readily accessible for adjustment after completion of the machine because derived from part of the revolving primary of the motor. In such a case the connections between 5 and 19 will be made as correctly as possible when building the machine and final adjustments, if needed, carried out by displacing the brushes. In all cases it may be convenient to make the final adjustments by brush displacement.

Fig. 4 differs from Fig. 1 in that the secondary of the motor carries a three-phase instead of a two-phase winding with a corresponding change in the polyphase arrangement of brushes on the exciter and in that the primary of the converter-exciter is located on the stator instead of on the rotor of the exciter. This change makes no difference to the manner of operation and this modification can be operated just like the other here described. Since the brushes of the exciter revolve they are inaccessible for adjustment during operation. These brushes, together with the member 7, can be keyed on the shaft 6 in as nearly correct position as is possible in order to produce a substantially pulsating or a substantially constant synchronizing torque when the supply is connected to certain points of the stationary winding 19 through the adjustable ratio transformer 78 and further adjustments, if needed, can be made by shifting these points of connection by means of the switches 70, 71, 72 and the taps 73 attached to the winding 19.

According to this invention, one or more voltages derived from an independent exciter are applied to one or more secondary windings of the motor to be synchronized to produce either a single-phase pulsating and substantially unidirectional synchronizing torque or a polyphase synchronizing torque which is substantially constant throughout each revolution. To produce these results said voltage or voltages must have a very definite phase relation to the voltage or voltages in the windings to which they are applied, they must be unidirectional at synchronous speed and of slip frequency at other speeds. At synchronism this voltage or voltages will produce a unidirectional magnetization; for the sake of convenience, they will be referred to as synchronizing voltages.

Figures 5, 7:
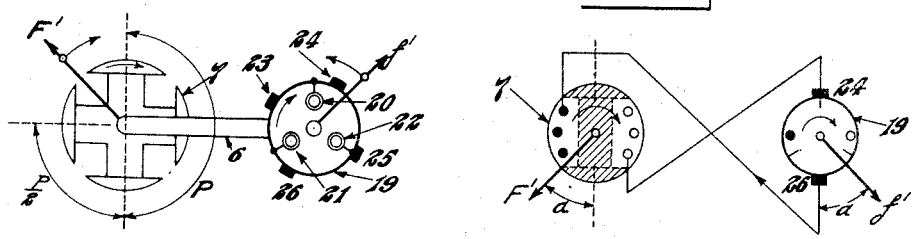

In order to show how the phase of a synchronizing voltage is to be selected or adjusted and how the synchronizing torque is produced, it is necessary to go to some extent into the theory of operation of the separately excited synchronous motor here described. In Fig. 5 is shown the revolving secondary member 7 of the motor of Fig. 1 and the revolving primary 19 of the exciter, both keyed to the same shaft 6 and therefore both revolving in the same direction. The secondary member 7 has four polar projections or four large slots and is laminated throughout. The polar projections are spaced by half a pole pitch and P in Fig. 5 measures the pole pitch of this two-pole motor. The brushes co-operating with the exciter winding 19 are located at random. If the primary 5 of the motor produces a revolving flux F', which revolves in a clockwise direction, then the rotor 7 starting as the secondary of an induction motor will revolve in the same direction and will cause the exciter 19 to also revolve clockwise. But the exciter 19 is to provide a unidirectional exciting voltage at synchronism, and for this reason the winding 19 must, through its slip-rings 20, 21, 22 be connected to the line 2, 3, 4 in such a way that with 19 at rest the revolving flux $f'$ produced by 19 will revolve counterclockwise. Under these conditions, this flux $f'$ will become stationary in space when the exciter revolves synchronously in a clockwise direction. After the machine has reached as high a speed as the induction motor torque can produce, the conditions are as follows: F' revolves synchronously and clockwise in space. The rotor 7 revolves in the same direction but at a slower rate; it "slips" to a certain extent. The winding 19 of the exciter revolves clockwise at the same speed as 7, and the revolving flux $f'$ revolves counterclockwise at slip speed. That which, according to this invention, is necessary in order to produce the single or polyphase synchronizing torque of the nature described is first, that any brush voltage generated by the exciter and impressed on a secondary winding of the motor be substantially zero when the axis of that winding coincides with the axis of the revolving flux F' set up by the primary 5 of the motor. Second, that when the axis of said secondary winding does not coincide with the axis of F', the direction of the brush voltage is such that the current is produced in the secondary of the motor to which it is applied is of a direction to produce a positive torque in co-operation with F'. In order to show the reason for these requirements in a simple manner, let it be supposed that the secondary 7 and the exciter winding 19 are standing still and that F' revolves with no-load slip frequency in a clockwise and $f'$ with no-load slip frequency in a counterclockwise direction. This is equivalent to considering the conditions obtaining at nearly synchronous speed. Not only are the measurements which will presently be outlined more easily made when the motor and the exciter run at that speed, but the phase conditions in the primary and secondary of the motor are not the same at starting and very near synchronism. The phase conditions existing near synchronism should be considered because the synchronizing torque is to be produced very near synchronism.

Figures 6, 8:
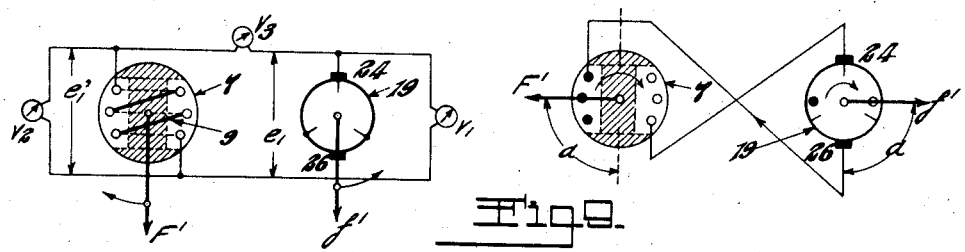

Turning now to Fig. 6, let it be assumed that the member 7 carries but a single winding 9 and has but two polar projections; also that but two brushes 24, 26 co-operate with the commuted winding 19 of the exciter. It is further assumed that the winding 9 is located in the slots shown in Fig. 6 and placed close to the periphery of a secondary member without defined polar projections such as would preferably be used in practice. The corresponding position of a secondary member with defined polar projections is indicated in dotted lines and this form of secondary member is lightly shaded to distinguish it from the rotor form. In the following Figs. 7, 8 and 9 the actual winding 9 is not shown, but the direction of the current in the rotor slots which accommodate this winding is indicated, the circles denoting an upwardly and the dots or full circles denoting a downwardly directed current. With the motor running as an induction machine at nearly synchronous speed, the revolving flux F' will cut the winding 9 at slip frequency and the conditions will be the same as if this winding stood still and F' revolved at slip frequency. When the axis of F' coincides with the axis of 9 as shown in Fig. 6, then the voltage $e'_1$ generated in 9 by F' will be zero and near synchronism, at slip frequency, a volt-meter $v_2$ connected to the terminals of 9, in other words, to the slip-rings 15, 16, will distinctly show when this voltage is zero provided the slip is small enough. Having now selected any desired position for the brushes 24, 26, for instance having displaced them by 90 electrical degrees with respect to the resultant magnetization produced by the exciting windings 29 and 30 to which they are connected, it is only necessary, in order to satisfy the first condition laid down above, to so manipulate or adjust the phase relation of the polyphase E. M. F.'s impressed on 19 with respect to the polyphase E. M. F.'s impressed on 5 as to cause the brush voltage $e_1$ measured by the volt-meter $v_1$ to become zero substantially at the same time as $e'_1$ measured by $v_2$ is zero. The brush voltage $e_1$ will be zero whenever the axis of $f'$ coincides with the brush axis. The adjustment of the phases of the E. M. F.'s impressed on 19 can very conveniently be carried out, for instance, by means of the phase changer 37, 38 of Fig. 1. By moving 38 relatively to 37 the phases of the E. M. F.'s impressed on 19 can be made to coincide with the phases of the line E. M. F.'s 2, 3, 4 or can be made to differ from these by any angle up to and including 180 degrees. But the phase of the synchronizing brush voltage $e_1$ can also be varied and adjusted to the desired relation by changing the points of connection of the supply to the winding 19 of the exciter as shown in Fig. 4. Conversely, having applied to 19 voltages bearing any desired phase relation to the supply voltages or having selected the points at which the supply voltages are connected to the winding 19 of the converter-exciter, the phase of the synchronizing voltage or voltages can be adjusted as desired by displacing the brushes co-operating with the commuted winding on the primary of the converter-exciter. Having so adjusted the phase of $f'$ with respect to that of F' or so set the exciter brushes as to have the voltages $e_1$ and $e'_1$ pass through zero at substantially the same time and connecting a volt-meter such as $v_3$ in series with the brushes 24, 26 and the winding 9, said volt-meter will read zero when $v_1$ and $v_2$ read zero. At any other instance, $v_3$ will read the arithmetical sum or difference of $v_1$ and $v_2$, and the next question is, should for the purposes of this invention $e_1$ be of same direction as $e'_1$ or oppose same. This is positively answered by Figs. 7, 8 and 9 but it can be answered in another way without reference to said figures.

Assuming that the winding 9 of Fig. 6 is short-circuited and that F' revolves with respect to it at slip frequency, then it is known that the voltage $e'_1$ generated in 9, when cut by F' and which voltage we have just caused to pass through zero when $e_1$ was passing through zero, is going to produce a current in 9, said current co-operating with F' to produce a positive torque. In fact, this is just the way in which the torque is produced in a polyphase induction motor, and the only reason why this torque cannot synchronize the motor in which it is produced is that the magnitude of said current and therefore of said torque depends on the slip, diminishes as this slip diminishes and becomes zero at synchronism. This consideration clearly determines the direction which the brush voltage should have. Since it is to produce a positive torque, it will certainly do this if it is of the same phase and direction as the voltage generated in 9 near synchronism by the synchronous rotation of F'. Under these conditions, the brush voltage, whose magnitude is independent of the slip, will continue to force through the secondaries of the motor that current which the secondary voltage generated by F' would have forced through that winding if it had been possible to maintain said secondary voltage $e'_1$ as synchronism was approached. According to this invention, there is introduced into the secondary of an induction motor a voltage or voltages of same phase direction and periodicity as the voltage or voltages generated in said secondary at nearly synchronous speeds by the revolving primary flux of the induction motor, each of these conduced voltages is made independent of the slip as to magnitude but dependent thereon as to frequency and each converted into a unidirectional voltage as synchronism is reached. When the secondary of the induction motor has a winding such as 9 or 10 in Fig. 1 with but one axis per pole pair, then but a single brush voltage or single-phase synchronizing voltage is used. When the secondary of the induction motor has a winding with a plurality of axes per pole pair such as 9 and 10 in Fig. 1 or 49 in other figures, then a polyphase synchronizing voltage may be used. Injecting a single-phase synchronizing voltage of proper phase and direction along one axis per pole pair produces a single-phase pulsating and substantially unidirectional synchronizing torque. Injecting polyphase synchronizing voltages of proper phase and direction into the secondary of the motor along a plurality of axes per pole pair produces a polyphase synchronizing torque. In all cases the adjustments must be so made that so long as the brush or synchronizing voltage is an alternating one, whether single or polyphase, it substantially coincides as to phase and direction with the voltage $e'_1$ generated by F' at nearly synchronous speeds in the secondary on which it is impressed. That these deductions are correct can be shown by reference to Figs. 7, 8 and 9.

Figure 9:
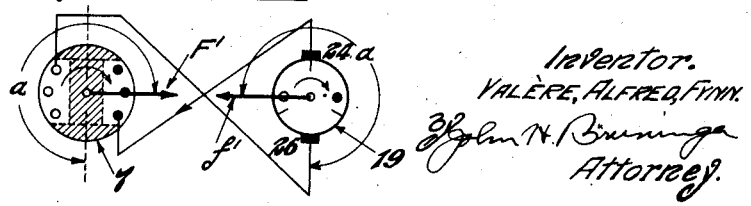

Having, for instance, so set the phase regulator 37, 38 as to cause the brush voltage $e_1$ to go through zero when the voltage $e'_1$ generated in 9 by F' also goes through zero, and having so connected the brushes 24, 26 to the terminals of 9 that in so far as 9 is concerned $e_1$ is of same direction as $e'_1$, let it further be assumed that, as in Fig. 7, the brush axis and the axis of 9 are vertical. Starting to count time from the instant when both fluxes $F'$ and $f'$ are in the vertical and directed downwardly, after each has traveled through an angle $a$ of about 45 degrees the voltage $e_1$ will be directed in 19 as shown by the dot and circle within the circle representing 19 and will force a current through 9 distributed as shown in 7 of Fig. 7. The direction of $e_1$ is determined by the fact that $f'$ crosses the brush line 24, 26 from left to right and the direction of rotation of 19 is clockwise. Remembering that $F'$ is generated by the primary winding 5 of the motor, it will be seen that in the position it occupies in Fig. 7 it will thread the rotor 7 from right to left and in so doing will produce, with the current distribution shown, a clockwise or positive torque. On the assumption of sinusoidal flux distribution and sinusoidal current and E. M. F. waves, the voltage $e_1$ will at all times be proportional to sine $a$ and that component of $F'$ which is at right angles to the axis of 9, and which alone is effective in producing torque with 9, will also at all times be proportional to sine $a$, with the result that the torque produced will be proportional to (sine$^2$ $a$) provided the directions here given are followed. In Fig. 8, each of the fluxes $F'$ and $f'$ has traveled through 90 degrees. The brush voltage is a maximum and all of $F'$ is effective so far as producing torque with the ampereturns in 9 is concerned. The synchronizing torque $T_1$ is a maximum. After a further travel through 90 degrees, the brush voltage becomes zero and the torque is zero. As $f'$ sweeps past the vertical, the brush voltage is reversed, as shown in Fig. 9, which depicts the conditions of maximum reversed brush voltage. This, of course, reverses the current through 9, but $F_1$ is also reversed, with the result that torque $T_1$ does not change its direction and remains positive.

Figure 10:
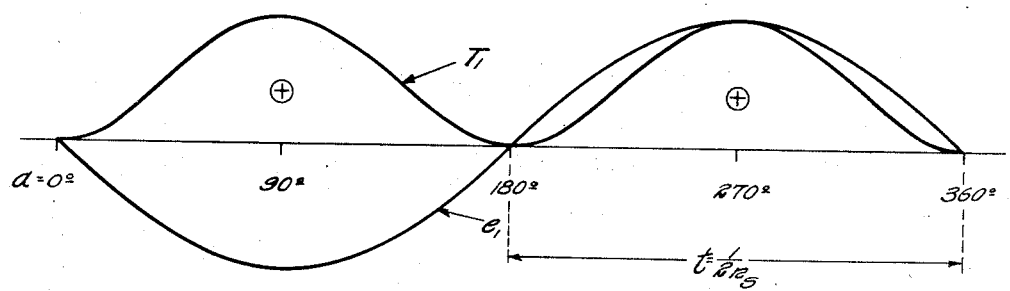

The variation of the brush voltage $e_1$ and the corresponding variations of the torque $T_1$ produced by the interaction of the synchronizing voltage collected by the brushes 24, 26 and conductively impressed on the secondary 9 of the synchronous induction motor are both shown in Fig. 10. The time during which each positive torque impulse lasts is $$\frac{1}{2n_s},$$

where $n_s$ is the slip frequency, and is equal to the time required for the brush voltage to go through half a cycle.

Figure 11:
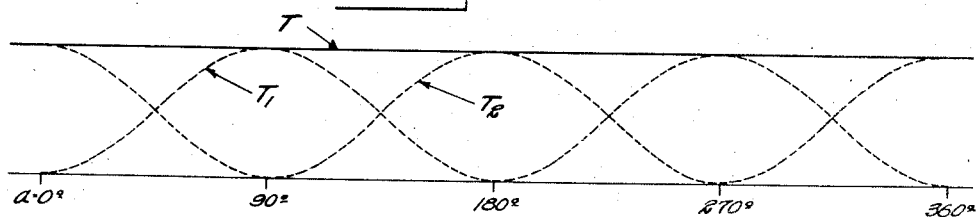

It will now be perfectly clear that if another set of brushes such as 23, 25 are located to co-operate with 19 and are displaced by 90 electrical degrees from the brushes 24, 26, it will make available a second single-phase brush voltage $e_2$ in phase quadrature with the first, and that if the directions here given with regard to $e_1$ are applied to $e_2$ and this second voltage is impressed on a second secondary such as 10 in quadrature space relation to 9, then a second synchronizing torque $T_2$, identical in form with $T_1$, will be produced in phase and space quadrature with $T_1$ as shown in Fig. 11. The sum of these two torques is the constant synchronizing torque $T$.

Since the synchronizing torque must be developed and maintained from that induction motor slip which corresponds to the load to be accelerated right up to synchronism, it is clear that during the synchronizing period the frequency of the brush voltage or voltages will vary from about 8% of the line frequency to zero, therefore from perhaps five cycles downwards in the case of a 60 cycle supply. For frequencies of this order of magnitude, it is not possible to create any appreciable phase difference either with a positive or a negative reactance and the insertion of impedances in the brush circuit would for this reason have no appreciable effect on the result. What is needed in order to make the synchronizing torque substantially unidirectional is to secure sufficiently close phase coincidence between the brush voltage and the secondary voltage which it is to replace. This torque will be substantially unidirectional when negative torque impulses are reduced to a small percentage of the positive ones or entirely eliminated. For this same reason, phase differences between brush voltage and resulting current have been neglected in connection with the discussion of Figs. 5 to 9, inclusive. This discussion only applies to synchronizing conditions and these are so very near the synchronous speed that said phase differences are very small and can be neglected.

If a synchronizing voltage of a phase and magnitude chosen in accordance with this invention were applied at starting to the secondary winding of the motor on which this voltage is impressed for synchronizing purposes, it would have practically no effect on the starting torque or on the torque per ampere at starting. For one thing, its magnitude is insufficient and its phase is unsuitable. To make it effective at starting, its magnitude would have to be greatly increased and its phase displaced through about 90 degrees or even more.

For the case of a two-phase arrangement of brushes on the exciter and a corresponding two-phase arrangement of induced windings on the secondary of the motor, the resultant constant polyphase synchronizing torque will have a value equal to the maximum amplitude of either component single-phase pulsating torque. In the case of a three-phase arrangement of brushes and induced windings, the resulting polyphase synchronizing torque will have a value equal to one and one half times the amplitude of one of the component single-phase pulsating torques.

Figure 12:
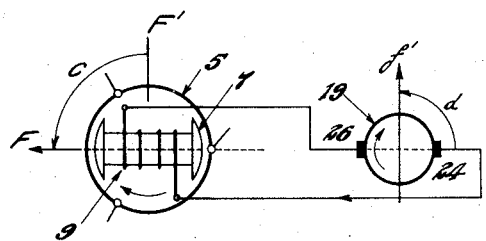
Figure 13:
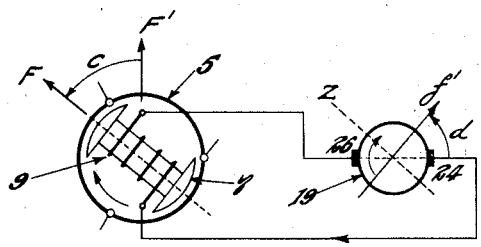

Turning back to the inherent regulating feature already broadly described, let it be assumed that the motor of Fig. 1 has been synchronized with a single-phase pulsating and therefore unidirectional torque by means of the winding 9 and the exciter brushes 24, 26. Having been synchronized as stated, the axis of the motor winding 9 must have lagged about 90 electrical degrees behind the axis of F' or the axis of a stator pole every time the voltage at the brushes 24, 26 was a maximum. See Fig. 12. Let $c$ measure this lag in degrees. If, in synchronous operation, the axis of 9 continues to revolve in the periodical space relation of $c=90°$ to the axis of the stator pole it is approaching, then the now unidirectional brush voltage will remain a maximum because the exciter revolving flux $f'$ will then remain stationary in a position at right angles to the axis of the brushes 24, 26, as also shown in Fig. 12. Such a periodical space relation may, under certain conditions, correspond to about the maximum synchronous torque. For lighter loads the rotor 7 will then momentarily accelerate and come to occupy a more forward periodical space relation to the axis of a stator pole, reducing the displacement $c$ to less than 90 electrical degrees, and correspondingly reducing the displacement $d$ between the axis of $f'$ and that of the exciter brushes 24, 26, but leaving $f'$ stationary after this temporary movement. In this new periodical space relation and the correspondingly changed position of $f'$, the unidirectional voltage must be lower. It varies as the sine of $d$. This means that the inherent regulating property operating under the conditions determined by the synchronizing torque setting above specified reduces the excitation with decreasing load. Generally speaking, this is desirable but the maximum synchronous torque is not always available for $c=90°$ and a decrease in exciting voltage substantially proportional to sine $d$ may, for instance, be too rapid. The maximum torque is more often available for a value of $c$ smaller than 90° and a slower decrease of exciting voltage is often preferable.

To change the rate at which the exciting voltage changes with changing load, it is necessary to change the relation between $c$ and $d$. In the case just analyzed, when $c$ lagged 90 degrees behind the axis of the stator pole ahead of it, $f'$ led the brush axis by $d=90$ degrees. When $c$ was smaller than 90 then $d$ was correspondingly smaller. It should be pointed out that the expressions lag and lead used in connection with $c$ and $d$ are arbitrary. The axis of 9 is referred to as lagging behind that of F' because in asynchronous operation the former tries to catch up with the latter. Similarly, $f'$ is said to lead the brush axis 26, 24 because $d$ is arbitrarily measured from the time when $f'$ coincides with the brush axis and because in asynchronous operation $f'$ revolves counter-clockwise.

If it were possible to make the brush voltage a maximum when the periodical space relation of 9 is that shown in Fig. 13, then for $c=90$ degrees the brush voltage would be less than the maximum, would increase to a maximum for the value of $c$ shown in Fig. 13, and then again decrease, thus completely changing the manner or rate of variation of the brush voltage with varying $c$. Generally speaking, $c$ decreases with decreasing load. Other things being equal, the value of $c$ for maximum torque depends on the magnitude of the unidirectional excitation increasing with increasing excitation. Therefore by causing the maximum brush voltage to occur for different values of $c$ or even outside the range of $c$, it is possible to considerably vary the compounding effect of the inherent regulating property of such motors.

The maximum brush voltage can be made to coincide with any selected value of $c$ or be displaced by any desired amount from any selected value of $c$ in a number of ways.

The exciter brushes may be displaced in the one or the other direction by means of 28. Thus if in Fig. 13 the brushes are moved forward, in the direction of rotation of 19, to the line $z$ perpendicular to $f'$, then $d$ will be 90 degrees and the brush voltage a maximum when $c$ has the value shown in Fig. 13 and which is smaller than 90°.

Instead of displacing the brushes as explained, the phases of the voltages impressed on the slip-rings of 19 may be changed so as to cause the flux $f'$ to occupy a different space position with reference to the brush axis. To cause the brush voltage to be a maximum for the position of 7 and of 24 and 26 shown in Fig. 13, the flux $f'$ should be moved $(90-d)$ degrees against the direction of rotation of 19, for instance, by means of the phase regulator 37, 38 of Fig. 1.

Another, and practically very interesting, method of correlating the maximum brush voltage to a selected value of the periodical space relation $c$ is to displace the axis of 9 or, more generally speaking, the axis of the resultant unidirectional rotor magnetization F with relation to the laminations of the rotor 7. The laminations 7 are keyed to the same shaft as the laminations carrying the exciter winding 19. If without changing this mechanical connection the winding 9 were so displaced or a new winding 9′ were so located as to produce a magnetization, say, (90—d) degrees in advance, i. e. in the direction of rotation, of that produced when 9 was in use and on which the synchronizing torque setting was based, then the axis of 9′ would occupy the position occupied by 9 in Fig. 13 when that of 9 was still 90 degrees behind F′. Since 9 is now assumed to be inactive, the axis of F would coincide with that of 9′, the periodical space relation of 9′ would be $c$ as it was for 9, but $f'$ would now be perpendicular to the brush axis and the brush voltage a maximum. This is all shown in Fig. 14. This means that by displacing the axis of the unidirectional magnetization F on the secondary of the motor with relation to that secondary, the relation of the maximum brush voltage with reference to any selected value of $c$ can be changed at will. A displacement of said axis in the direction of rotation is equivalent to a displacement of the exciter brush axis in the same direction and the same angular displacement, reduced to electrical degrees, produces the same quantitative change.

Figure 14:
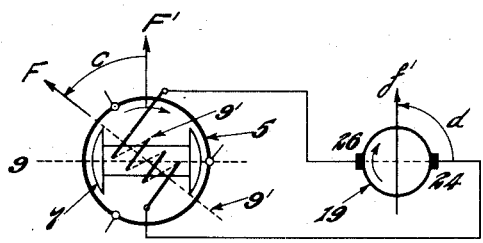

When the secondary member of the motor is provided with displaced windings such as 9, 10 of Figs. 1 or 2 and 49′, 49″, 49‴ of Figs. 3 and 4, which are available for connection to the exciter brushes, then the axis of the total or resultant unidirectional magnetization F of the secondary of the motor can readily be displaced with respect to said secondary by connecting a plurality of such windings in parallel to the same pair or set of exciter brushes and suitably adjusting the resistances of the windings themselves, their number of turns or external resistances connected between said windings and the exciter brushes. Thus the windings 9 and 10 of Fig. 1 may have the same number of turns and they may be connected in parallel and to the brushes 24, 26 for synchronizing the resistances 53, 54, being so adjusted as to, for instance, cause each to produce an equal number of ampereturns. The resultant magnetization F will have an axis lying midway between the axes of 9 and 10. The synchronizing torque setting is now made with reference to the axis of the resultant F. If a unidirectional torque is desired, the setting will be such that the alternating brush voltage is a maximum when the axis of F is perpendicular to that of F′. If, when the machine reaches synchronism, the resulting inherent variation of excitation is not suitable for the purpose in hand, it may be modified to any reasonable extent by simply manipulating the resistances 33 and 34. If the leading magnetization is $k$ produced by 10 and the axis of the resultant is to be advanced as indicated in Fig. 14, then the number of ampereturns in 10 is increased relatively to that in 9. When the magnitude of the resultant F, but not its relation to the laminations of the secondary, is to be modified, then the ampereturns in 9 and in 10 are varied in the same ratio.

The axis of F may also be moved through a definite angle by a simple change of connections. Thus in Fig. 3 after the motor has run up to nearly synchronous speed and 50 short-circuits the windings 49′, 49″, 49‴, the brushes 54, 55 may be connected to 49′ and 49″ after 49′ has been disconnected from 50 and the machine synchronized as heretofore explained. If the axis of the unidirectional magnetization on the secondary of the motor is now to be shifted with respect to the stator laminations, 49″ or 49‴ is disconnected from 50, with the result that the axis of F is moved through 30 degrees if the number of turns in 49′, 49″, 49‴ are the same and through some other angle if they differ from each other.

A compromise may often be desirable for the sake of greater simplicity. When the periodical space relation $c$ at which the maximum brush voltage is desired is, for instance, somewhere near 45 degrees, then changes after synchronization can be avoided by sacrificing synchronizing efficiency in favor of the compounding feature to a greater or smaller extent according to circumstances. The governing factors are as follows: If the synchronizing torque setting differs by 90 electrical degrees from that which gives an absolutely unidirectional but pulsating torque, then the resulting synchronizing torque will be of double slip frequency and have equal positive and negative maxima, each equal to half the available maximum synchronizing torque, an obviously undesirable condition. If the difference is only 45 degrees, the positive maxima will last three times as long as the negative and the latter will be but 18% of the former. The maximum torque in this case will be but 18% smaller than the maximum available and the synchronizing torque may still be said to be substantially a pulsating torque or, a substantially unidirectional torque. The fact is that when the phase difference is less than 90 degrees, the synchronizing torque has one component which alternates at double slip frequency and another which is unidirectional and pulsates at slip frequency. As the phase difference decreases the amplitude of the first component decreases and that of the second increases. When the amplitude of the pulsating component equals or exceeds that of the alternating component, the resultant torque becomes of practical interest and may be said to be substantially unidirectional. As the phase difference diminishes still further, the duration and the amplitude of the positive impulses of the resultant synchronizing torque both increase while those of the negative impulses diminish until phase coincidence is reached, when all vestige of a negative torque disappears. It is therefore seen that there is ample room for a reasonably satisfactory compromise even under quite severe requirements as to regulation as well as synchronizing capacity.

What is true of the single-phase synchronizing torque is also true of the polyphase synchronizing effort, except that even better synchronizing results are secured and for discrepancies in the setting of the order named, only the constancy of the magnitude of the resultant torque is affected while its direction does not change at any time.

Having fully described and explained the invention, the preferred form of motor and the preferred methods of operation can be shortly stated. Since separately excited motors will mostly be of large size, the preferred form is selected with large motors in view.

In the preferred form of motor the primary is of the usual construction and is located on the stator, the secondary carries a squirrel cage 8 or the like and at least two displaced windings such as 9 and 10 connected to three or four slip-rings.

The exciter is driven at a higher speed than the motor, its primary revolves and cooperates with a single-phase arrangement of stationary brushes carried by a secondary provided with exciting means which produce a unidirectional magnetization at synchronism and permit of the position of the axis of said magnetization to be adjusted. Adjustable resistances are provided between the exciter brushes and the displaced slip-ring windings on the secondary of the motor and other adjustable resistances are connected to shunt the windings on said secondary.

For heavy starting the winding 8 has a high resistance so the primary can be connected to the full line voltage at starting. For easy starting conditions, the winding 8 has a lower resistance and the primary is preferably first connected to less than the full line voltage.

One method of operating such a combination is to use the slip-ring windings to develop at least part of the induction motor torque at starting, to inject into the parallel connected slip-ring windings near synchronism an auxiliary or exciting voltage of slip frequency of a magnitude independent of said frequency and of a phase to produce a substantially maximum and unidirectional single-phase synchronizing torque and thereafter, or at synchronism, to change the phase of the synchronizing voltage to produce the desired compounding characteristic, for instance by changing the ratio of the ampere-turns of the slip-ring windings connected to the exciting voltage.

Another is to use the slip-ring windings to develop at least part of the induction motor torque at starting, to inject into one of said windings near synchronism an auxiliary or exciting voltage of slip frequency of a magnitude independent of said frequency and of a phase to produce a substantially maximum and unidirectional single-phase synchronizing torque and thereafter to change the phase of the synchronizing voltage to produce the desired compounding characteristic, for instance by displacing the exciter brushes.

A third method is to use the slip-ring windings to develop at least part of the induction motor torque at starting and to inject into at least one slip-ring winding an auxiliary or exciting voltage of slip frequency of a magnitude independent of said frequency and of a phase to produce a substantially unidirectional single-phase synchronizing torque and substantially the desired compounding characteristic in normal operation.

A fourth method applicable to a motor provided with an exciter having a polyphase arrangement of brushes is to use the slip-ring windings to develop at least part of the induction motor torque at starting, to inject into a plurality of said slip-ring windings a polyphase auxiliary or exciting voltage of slip frequency of a magnitude independent of said frequency and of a phase to produce a synchronizing torque of nearly constant magnitude, and thereafter to reduce the ampereturns due to all but one of said auxiliary or voltages the phase of which is also so chosen as to give the desired compounding characteristic when left connected to its slip-ring winding. Where the ampereturns are reduced to zero, the corresponding windings may be disconnected from the exciter and short-circuited.

Finally, the motor may be operated as last described but without disconnecting any of the slip-ring windings from the polyphase arrangement of excited brushes and without otherwise modifying the synchronizing circuits, in which case I believe that the motor will run at a super-synchronous speed at some loads.

Any auxiliary, or synchronizing, or brush voltage derived from my frequency converter and conductively impressed on the secondary for the purpose of synchronizing the motor is always of the slip frequency of the secondary of said motor. Its frequency therefore diminishes with decreasing motor slip becoming zero when said motor reaches synchronism. The amplitude of this auxiliary voltage is however quite independent of its frequency and when its phase and magnitude are set, as here disclosed, to secure a unidirectional or a substantially unidirectional synchronizing torque of sufficient value, its magnitude, if no adjustments are made, is maintained at a nearly constant value until the motor locks into synchronism. In this it differs vitally from the voltage generated by the primary flux in the secondary winding or windings upon which such an auxiliary voltage is impressed. It is because the magnitude or amplitude of a generated voltage is not maintained as synchronism is approached that it is unable to synchronize the motor. An important feature of my invention is therefore to maintain the magnitude or amplitude of this auxiliary voltage as synchronism is approached, and by maintain I mean to preferably keep it at or above a value sufficient to synchronize the motor and to certainly preserve it from lapsing or declining to insignificant values as synchronism is approached. Increasing this voltage as synchronism is approached of course increases the synchronizing torque, and vice versa.

In order to secure the best starting performance and take full advantage of the pulsating and substantially unidirectional single-phase or the substantially constant polyphase synchronizing torque, the motor is preferably designed along the lines now recognized as best for polyphase induction motors. This means a stator and rotor construction without defined polar projections, distributed windings on both members and as small an air-gap as mechanical considerations will permit.

It is not necessary for the exciter to be directly coupled to the motor or to be driven in any other manner at the same speed as the latter. The exciter may have a different number of poles, and may be run at a speed differing from that of the motor, preferably at a higher speed, just so provision is made for a constant ratio of motor and exciter speeds to be maintained, a matter which can be achieved in a number of known ways, for instance, by suitably proportioned gearing. Where the motor runs synchronously the exciter should also run synchronously. The exciter may also be built without defined polar projections and more or less distributed windings.

It is to be understood that a synchronous motor is a machine capable of operating at a constant and synchronous speed under varying load conditions and which does so operate. The synchronous motors described in this specification carry unidirectional ampereturns on their secondary and unless the organization of the machine is such as to permit, with changing torque demand, (1) of an angular displacement between the axis of said ampereturns and the axis of the resultant motor magnetization, or (2) of a change in the magnitude of said ampereturns or (3) of said angular displacement and of said change in magnitude, the motor cannot and does not run at a constant and synchronous speed under varying load conditions.

It is further to be understood that by "synchronous torque" is meant a torque exerted by a synchronous motor when in normal operation and therefore when running synchronously under load. By "synchronizing torque" is meant any torque adapted to or capable of bringing up to synchronism a motor capable of operating synchronously under varying load conditions. It is, for instance, known that an ordinary polyphase induction motor is a non-synchronous machine the torque of which falls off very rapidly as synchronism is approached and actually becomes zero at synchronism. It is also known that a polyphase induction motor can be so modified as to make it capable of operating synchronously under varying load conditions. Any torque which, in a polyphase induction motor adapted to operate synchronously under varying load, will bridge the gap between the induction motor torque of the machine, which becomes zero at synchronism, and its synchronism torque is referred to as a "synchronizing torque".

A synchronous motor is said to be "compounded" when the unidirectional ampereturns on the secondary are smaller at light than at heavy loads. This change in the unidirectional ampereturns with changing load affects the power factor at which the machine operates. The change can be such that the power factor remains practically constant throughout the synchronous load range of the motor, or it can be such that the power factor is a leading one at light loads, that this lead diminishes with increasing load and is converted into a lag near the maximum synchronous torque of the machine. Either of these "compounding characteristics" are popular and right now the last named is probably more in demand.

While the invention is illustrated and specifically described as applied to separately excited synchronous induction motors, it will be understood that in many of its aspects the invention is applicable to self-excited machines; furthermore, certain of the features of this invention are applicable to synchronous motors generally whether wound for single or polyphase currents. While theories have been advanced as to operation of the machines and methods here described, this has been done with a view to facilitating the description and it is to be understood that I do not bind myself to these or any other theories.

It will be clear that various changes may be made in the details of this disclosure without departing from the spirit of this invention, and it is, therefore, to be understood that this invention is not to be limited to the specific details here shown and described. In the appended claims I aim to cover all the modifications which are within the scope of my invention.

Claims:—

1. The method of operating a motor which carries variable load at synchronous speed, comprising, producing a primary flux which revolves with respect to the primary, causing the primary flux to generate induction-motor-torque producing ampereturns on the secondary, introducing into a winding on the secondary an auxiliary voltage of same frequency as the voltage generated in the secondary winding by the primary flux at nearly synchronous speeds and in substantially less than quadrature phase relation to the generated voltage, and maintaining the magnitude of the auxiliary voltage until synchronism is reached to produce a substantially unidirectional synchronizing torque.

2. The method of operating a motor which carries variable load at synchronous speed, comprising, producing a primary flux which revolves with respect to the primary, causing the primary flux to generate induction-motor-torque producing ampereturns on the secondary, introducing into a winding on the secondary an auxiliary voltage of same frequency and of about the same phase as the voltage generated in the secondary winding by the primary flux at nearly synchronous speeds, and maintaining the magnitude of the auxiliary voltage until synchronism is reached to produce a synchronizing torque.

3. The method of operating a motor which carries variable load at synchronous speed, comprising, producing a primary flux which revolves with respect to the primary, causing the primary flux to generate induction-motor-torque producing ampereturns on the secondary, introducing into displaced windings on the secondary auxiliary phase displaced voltages of the same frequency as the voltages generated in said windings by the primary flux at nearly synchronous speeds and in substantially less than quadrature phase relation to the corresponding generated voltages, and maintaining the magnitude of the auxiliary voltages until synchronism is reached to produce phase displaced and substantially unidirectional synchronizing torques.

4. The method of operating a motor which carries variable load at synchronous speed, comprising, producing a primary flux which revolves with respect to the primary, causing the primary flux to generate induction-motor-torque producing ampereturns on the secondary, introducing into a winding on the secondary an auxiliary voltage of same frequency as the voltage generated in the secondary winding by the primary flux at nearly synchronous speeds, said auxiliary voltage having an amplitude independent of its frequency and becoming unidirectional at synchronism, and adjusting the phase of the auxiliary voltage to produce near synchronism, a substantially unidirectional synchronizing torque and at synchronism a unidirectional magnetization which increases with increasing motor load.

5. The method of operating a motor which carries variable load at synchronous speed and starts as an induction motor by the interaction of a primary flux which revolves with respect to the primary and a secondary, comprising introducing into displaced windings on the secondary, phase displaced voltages which near synchronism are of slip frequency and are unidirectional at synchronism, adjusting the phases and magnitudes of the voltages to produce near synchronism a substantially constant synchronizing torque, and changing the relative adjustments of the two introduced voltages after synchronism has been reached.

6. The method of operating a motor which carries variable load at synchronous speed, comprising, producing a primary flux which revolves with respect to the primary, causing the primary flux to generate secondary torque producing currents in relatively displaced secondary circuits at speeds below synchronism, producing an auxiliary voltage which is of slip frequency at sub-synchronous speeds, of an amplitude independent of its frequency and unidirectional at synchronism, impressing an auxiliary voltage on two of the displaced secondary circuits to produce a substantially unidirectional synchronizing torque and at synchronism the unidirectional magnetization of the motor, and adjusting the axis of the resultant secondary unidirectional magnetization with reference to the axis of a secondary circuit.

7. A motor which carries variable load at synchronous speed, having a primary member adapted to produce a primary flux which revolves with respect to the primary, a secondary member having a winding in inductive relation to said primary flux, means for impressing on said secondary winding an auxiliary voltage which is of slip frequency and of an amplitude independent of its frequency, and means for controlling the phase of said voltage relatively to the phase of the voltage generated in said secondary winding by the primary flux adapted to produce near synchronism a substantially unidirectional synchronizing torque.

8. A motor which carries variable load at synchronous speed, adapted to produce a primary flux which revolves with respect to the primary, a secondary member having displaced windings in inductive relation to said primary flux, means for impressing on said secondary winding phase displaced auxiliary voltages which are of slip frequency and of an amplitude independent of their frequency, and means for controlling the phases of the auxiliary voltages with respect to the phases of the voltages generated in the displaced windings on the secondary by the primary flux adapted to produce near synchronism a plurality of phase displaced and substantially unidirectional synchronizing torques and at synchronism a unidirectional magnetization the torque producing component of which varies with varying motor load.

9. A motor which carries variable load at synchronous speed, having a primary member adapted to produce a primary flux which revolves with respect to the primary, a secondary member having a winding in inductive relation to said primary flux, means for impressing on said secondary winding an auxiliary voltage which is of slip frequency, of an amplitude independent of its frequency and which is unidirectional at synchronism, and means for controlling the phase of said auxiliary voltage with respect to the phase of the voltage generated in the winding on the secondary by the primary flux adapted to produce near synchronism a substantially unidirectional synchronizing torque and adapted to produce at synchronism a unidirectional magnetization which increases with the load.

10. A motor which carries variable load at synchronous speed, comprising, a primary member having a winding adapted for connection to an alternating current supply, a secondary member adapted to produce a unidirectional magnetization, an exciter supplying to the secondary at synchronism a unidirectional voltage which changes in magnitude with changing synchronous motor load, and means for varying the axis of the unidirectional magnetization produced by the secondary member with respect to that member for the purpose of changing the relation between changing motor load and changing secondary magnetization.

11. A motor which carries variable load at synchronous speed, comprising, a primary member having a winding adapted for connection to an alternating current supply, a secondary member having two displaced windings, an exciter driven to revolve synchronously when the motor so revolves, means including the primary of the exciter for producing in the exciter a flux which revolves with the line frequency with respect to the primary of the exciter, brushes on the exciter adapted to be connected to both of the windings on the secondary and means for varying the relation of the ampere turns produced by the two windings.

12. A motor which carries variable load at synchronous speed, comprising, a primary member having a winding adapted for connection to an alternating current supply, a secondary having a winding, an exciter driven to revolve synchronously when the motor so revolves, means including the primary of the exciter for producing in the exciter a flux revolving with line frequency with respect to the exciter primary, brushes on the exciter adapted to be connected to the secondary winding, and means for producing in the exciter another magnetization which is unidirectional and always stationary with respect to said brushes.

13. A motor which carries variable load at synchronous speed, comprising, a primary member having a winding adapted to produce a primary flux which revolves with respect to the primary, a secondary member having a winding, means for producing and impressing on the secondary winding a synchronizing voltage of a magnitude independent of its frequency and of same frequency as that of the voltage generated in said winding by the primary flux, and means for controlling the phase of the synchronizing voltage adapted, at speeds very near the synchronous, to cause it to pass through zero approximately when the axis of the secondary winding coincides with the axis of the primary flux.

14. A motor which carries variable load at synchronous speed, having a primary member adapted to produce a primary flux which revolves with respect to the primary, a secondary member having a winding in inductive relation to the primary flux, a source of auxiliary voltage, and means including the winding on the secondary and said source adapted to produce a substantially unidirectional and pulsating synchronizing torque between primary and secondary members, whereby the motor can be brought into synchronism and caused to operate synchronously at a plurality of loads.

15. A motor which carries variable load at synchronous speed, having a primary member adapted to produce a primary flux which revolves with respect to the primary, a secondary member having a winding in inductive relation to the primary flux, a source of auxiliary voltage, and means including the winding on the secondary and the said source adapted to produce between the primary and secondary members an alternating synchronizing torque the positive maxima of which substantially exceed its negative maxima, whereby the motor can be brought into synchronism and caused to operate synchronously at a plurality of motor loads.

16. A motor which carries variable load at synchronous speed, having a primary member adapted to produce a primary flux which revolves with respect to the primary, a secondary member carrying displaced windings in inductive relation to the primary flux, a source of auxiliary voltages, means including the displaced windings on the secondary and the source adapted to produce auxiliary ampereturns on the secondary cooperating with the primary flux to generate phase displaced synchronizing torques which combine to form a resultant continuous torque of varying magnitude between the primary and secondary members.

In testimony whereof I affix my signature this 2nd day of February, 1924.

VALÈRE ALFRED FYNN.

Certificate of Correction.

It is hereby certified that in Letters Patent No. 1,599,756, granted September 14, 1926, upon the application of Valère Alfred Fynn, of St. Louis, Missouri, for an improvement in "Synchronous Motors," errors appear in the printed specification requiring correction as follows: Page 5, line 113, for the word "other" read *others;* page 7, line 47, for the word "instance" read *instant;* page 11, line 110, for the word "excited" read *exciter;* page 13, line 101, claim 6, for the word "an" read *the;* and that the said Letters Patent should be read with these corrections therein that the same may conform to the record of the case in the Patent Office.

Signed and sealed this 26th day of October, A. D. 1926.

[SEAL.]
WM. A. KINNAN,
*Acting Commissioner of Patents.*